United States Patent
Eagle, Jr.

(10) Patent No.: US 8,484,047 B2
(45) Date of Patent: *Jul. 9, 2013

(54) SYSTEM AND METHOD FOR SCHEDULING TRAVEL ON A CHARTER TRANSPORT

(75) Inventor: Bryan M. Eagle, Jr., Memphis, TN (US)

(73) Assignee: Memphis Ventures, Memphis, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/486,164

(22) Filed: Jun. 1, 2012

(65) Prior Publication Data

US 2012/0239441 A1 Sep. 20, 2012

Related U.S. Application Data

(63) Continuation of application No. 12/366,439, filed on Feb. 5, 2009, now Pat. No. 8,200,503, which is a continuation of application No. 09/531,956, filed on Mar. 21, 2000, now abandoned.

(51) Int. Cl.
*G06Q 10/00* (2012.01)

(52) U.S. Cl.
USPC .................................. 705/2; 705/3

(58) Field of Classification Search
USPC ............................................ 705/2
See application file for complete search history.

(56) References Cited

U.S. PATENT DOCUMENTS

| | | | |
|---|---|---|---|
| 2,542,890 A | 2/1951 | Basu et al. | |
| 3,953,720 A | 4/1976 | Kelch | |
| 4,360,875 A | 11/1982 | Behnke | |
| 4,775,936 A | 10/1988 | Jung | |
| 4,992,940 A | 2/1991 | Dworkin | |
| 5,253,165 A | 10/1993 | Leiseca et al. | |
| 5,255,184 A | 10/1993 | Hornick et al. | |
| 5,604,676 A | 2/1997 | Penzias | |
| 5,778,381 A | 7/1998 | Sandifer | |
| 5,794,207 A | 8/1998 | Walker et al. | |
| 5,832,454 A | 11/1998 | Jafri et al. | |
| 5,835,716 A | 11/1998 | Hunt et al. | |
| 5,850,433 A | 12/1998 | Rondeau | |
| 5,897,620 A | 4/1999 | Walker et al. | |
| 5,953,706 A | 9/1999 | Patel | |
| 6,067,532 A | 5/2000 | Gebb | |

(Continued)

FOREIGN PATENT DOCUMENTS

EP 1074931 2/2001

OTHER PUBLICATIONS

Amended Complaint filed with the Eastern District of Virginia ,"*Patent Licensing and Investment Company, LLC v. Green Jets Incorporated*", 2:10-cv-0042-HCM-DEM (since transferred to U.S. District Court for the Southern District of Florida, West Palm Beach Division, 11-80689-CIV-Marra) (referring to the SABRE system)., Apr. 19, 2011.

(Continued)

*Primary Examiner* — Hiep V Nguyen
(74) *Attorney, Agent, or Firm* — Morris & Kamlay LLP

(57) ABSTRACT

A method is disclosed for scheduling travel on a charter transport. The method can include obtaining from a traveler a passenger accommodation request identifying an origin-destination-pair. The method can also include automatically identifying one or more charter transports having an available passenger accommodation. Moreover, the method can include notifying the traveler of the available passenger accommodation.

10 Claims, 2 Drawing Sheets

U.S. PATENT DOCUMENTS

| | | | |
|---|---|---|---|
| 6,076,067 | A | 6/2000 | Jacobs et al. |
| 6,085,169 | A | 7/2000 | Walker et al. |
| 6,188,989 | B1 | 2/2001 | Kennedy |
| 6,459,986 | B1 | 10/2002 | Boyce et al. |
| 6,711,548 | B1 * | 3/2004 | Rosenblatt ......................... 705/6 |
| 7,801,751 | B2 | 9/2010 | Walker et al. |
| 2001/0044788 | A1 | 11/2001 | Demir et al. |

OTHER PUBLICATIONS

Bittle, "UniTravel Selling consolidator tickets on line", Travel Weekly, v55, n23, p. 74, Mar. 21, 1996.

Business Wire, "BostonCoach and Skyjet.com Announce 'Home to Jet' Transportation Services", p. 1, May 20, 1999.

Elliott, "Low Fares Online Travel agents launch Internet sites to market their air consolidation services", Travel Agent, p. 22, Mar. 31, 1997.

Green Jets Incorporated, "Defendant Green Jets Incorporated's Memorandum of Law in Opposition to Plaintiff's Motion to Dismiss the Complaint Pursuant to Fed. R. Civ. P. 41(a)(2) and to Dismiss the Counterclaims Pursuant to Fed. R. Civ. P. 12(b)(1)", United States District Court, Southern District of Florida, Case No. 11-80689-CIV-Marra/Hopkins, Mar. 19, 2012.

Jonas, "Air Charters Fly to Internet", Business Travel News; vol. 16, Iss. 26, p. 42, Nov. 15, 1999.

Pina, "Consolidator: trade should not be leery of us.", Travel Weekly, v54, n10, p. 31, Feb. 6, 1995.

PR Newswire, "Booking Private Jets Online: Skyjet.com Air Charter Reservation Service Creates On-Demand Airlines", p. 963Nov. 10, 1999.

United States Court of Appeals for the Federal Circuit ,"*Aycock Engineering, Inc.* v. *Airflite, Inc.*", 2008-1154 (Cancellation U.S. Appl. No. 92/032,520).

* cited by examiner

SYSTEM AND METHOD FOR SCHEDULING TRAVEL ON A CHARTER TRANSPORT

CROSS REFERENCE TO RELATED APPLICATIONS

This application is a continuation of U.S. application Ser. No. 12/366,439 filed 5 Feb. 2009, now U.S. Pat. No. 8200503 which is a continuation of U.S. application Ser. No. 09/531956 filed 21 Mar. 2000, now abandoned the content of which are incorporated herein by reference in their entirety.

FIELD OF THE INVENTION

The present invention relates to the field of travel, and, more particularly, to a system and method for scheduling travel on a charter transport.

BRIEF DESCRIPTION OF THE DRAWINGS

The invention will be more readily understood through the following detailed description, with reference to the accompanying drawings, in which.

DETAILED DESCRIPTION

Figure 1:
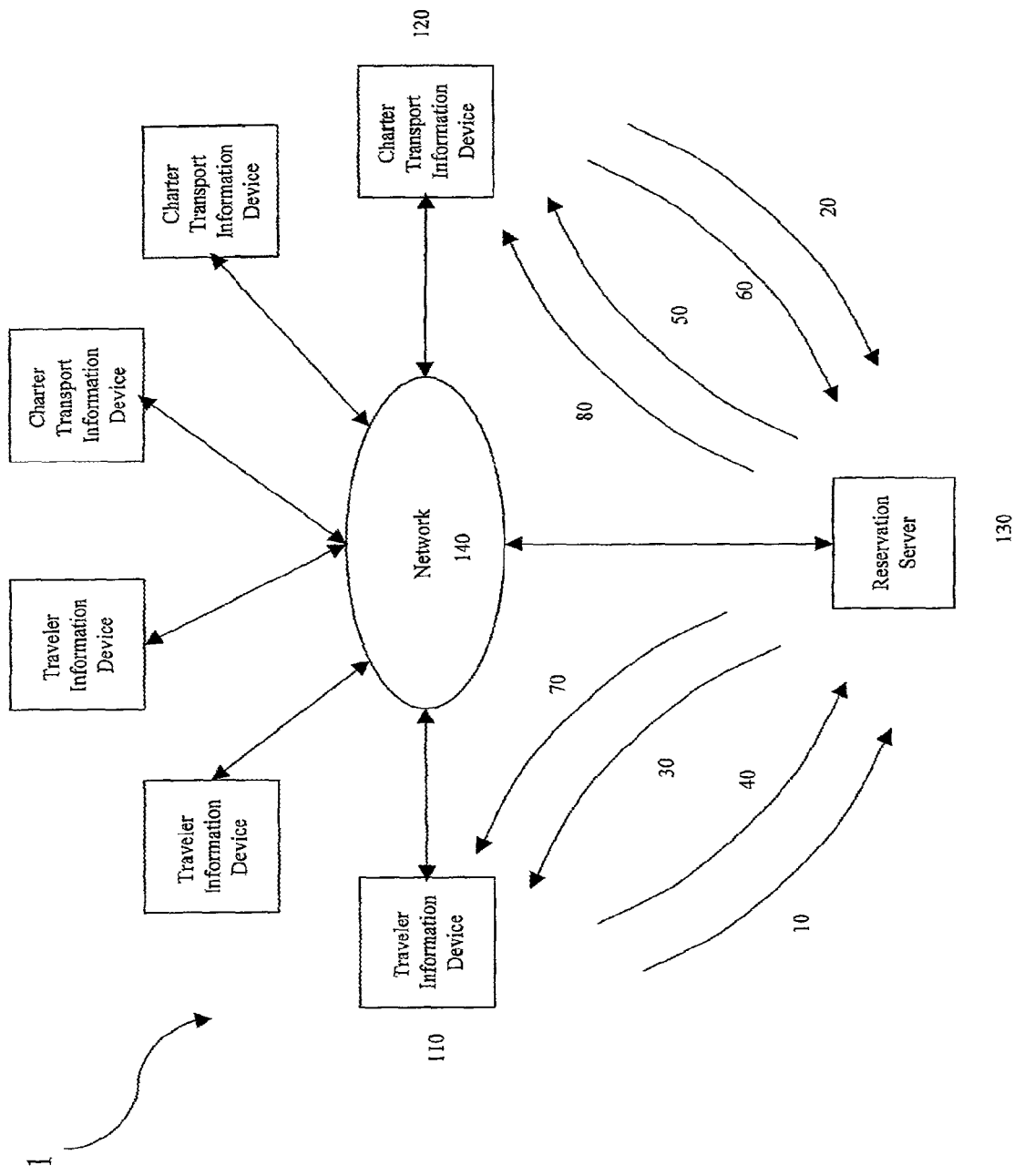
FIG. 1 is a block diagram of an embodiment of a system of the present invention.

There are approximately 800 charter jet operators in the United States operating under the "Part 135" rules of the Federal Aviation Administration (FAA). Part 135 operators are "on demand" operators that provide non-scheduled charter service. Unlike scheduled operators, the timing of the flight is at the discretion of the customer.

There are approximately 4,400 private jet aircraft in service today. Each year these planes fly an average of 260 flights. A small minority of these planes are corporate jets. The vast majority of these planes, however, are owned by the 800 "Part 135" charter operators and are chartered by travelers on a per flight-hour basis. Charges vary between a low of $1,200 an hour of flight time for a small Lear jet with a capacity of 5 to as much as $8,000 per hour or more for a larger Challenger with room for at least 10.

Typically, a traveler on a Part 135 plane charters the entire plane, rather than a seat on the plane. Thus, for example, when a traveler charters the plane for a trip from New York to Chicago for an overnight trip, the plane stays at the airport and waits for that traveler. Charges for the overnight stay for the pilots are added. If the traveler is staying many days or only needs the jet one way, the plane will typically immediately return to its home base and the cost of this "empty leg" or "deadhead" trip will be included in the rate for a one-way rental. It is estimated that there are over 114,000 empty leg flights a year.

Today, the air charter industry has little incentive to fill empty legs, because each empty leg is already paid for by the person chartering the plane for the flight that creates an empty leg. For example, if someone needs to fly from Washington to Atlanta and return on the same day or even the next day, typically the crew will wait on the ground for the passenger(s) and an extra fee will be added for overnight accommodations for the crew. If that person only needs the plane one way, or if the passenger(s) need to stay for an extended trip, the plane will return to its base that day. The charter operator then adds the cost of this return trip to the cost of the charter. Some charter operators will then attempt to fill this leg by calling charter operators in the city that the plane is returning from and ask them if they know of anyone needing a charter from that city to a city "in-line" and/or intermediate to the return destination. In most cases the trip will go unfilled. If it is filled, the full rate for the plane is charged and, typically, a partial credit is issued to the person who originally chartered the plane.

One embodiment of the present invention includes an Internet-based reservation system, that allows charter jet operators to fill empty legs of charter flights by selling seats on these legs directly to travelers. A traveler can log onto the reservation system web site, see the availability of seats on these jets, and purchase an available seat. The system can handle the settlement charges and can take a fee for its services. Ultimately, by being able to fill the seats on a plane as opposed to simply chartering the plane, the system can dramatically reduce the cost of chartering and increase demand for private jet travel. Thus, the system has the potential to drastically increase the utilization of charter jets in the US and overseas.

FIG. 1 is a block diagram of an embodiment of a reservation system 1 of the present invention. System 1 can include one or more traveler information devices 110, one or more charter operator information device 120, and a reservation server 130, each connected via a network 140.

Within system 1, traveler information device 110 can be used by a traveler to interact with a reservation service at server 130 to, for example, request a passenger accommodation reservation, receive notice of a passenger accommodation and/or reservation, provide payment for a reservation, provide notice of delays, etc. Charter operator information device 120 can be used by a charter transport operator and/or a charter transport service operator to interact with a reservation service at server 130 to, for example, communicate an availability of a charter transport, submit bids to fulfill a passenger accommodation reservation request, receive notice of a passenger accommodation reservation, provide notice of charter run delays, receive notice of passenger delays, receive payment for a passenger accommodation reservation, etc.

FIG. 1 also shows, using curved arrows, a method 2 of the present invention in the form of exemplary information flows within system 1. During exemplary information flow 10, a traveler can communicate a request for a passenger accommodation reservation to the reservation service. The request can include one or more origin-destination-pairs (e.g., city-pairs, airport-pairs, port-pairs, etc.), as well as departure dates and times and/or arrival dates and times. Any arrival time or destination time can be expressed as a specific time, such as 9:00 AM. Moreover, any arrival time or destination time can be expressed as a time period, such as between 9:00 AM and 11:00 AM. Furthermore, any arrival time or destination time can be expressed as a time limit, such as, no earlier than 9:00 AM.

By way of further example, a traveler can send a request for two seats on a charter transport that is flying from Northern Virginia to Hilton Head, South Carolina on the morning of Jun. 12, 2000. Additional requests can be received from the same and/or different travelers.

During exemplary information flow 20, the reservation service can receive information from the charter transport service operator regarding the availability of a charter transport. By way of further example, a charter transport service operator called RoyalAir can notify the accommodation reservation service that a Lear having 3 available seats will be departing Dulles Airport in Northern Virginia on Jun. 12, 2000 at approximately 9:00 AM in route to Jacksonville, Fla.

After comparing the outstanding requests with the availability information, and detecting a match according to a match criteria, during exemplary information flow 30 the reservation service can communicate a notification to the traveler of the availability of two seats (on the Lear) corresponding to the traveler's request and offering to reserve those seats for the traveler and his/her companion.

During exemplary information flow 40, the traveler can accept the seat reservations and provide payment for the reservations. During exemplary information flow 50, the reservation service can notify RoyalAir of the reservation and information regarding the passengers holding the seat reservations. During exemplary information flow 60, RoyalAir can notify the reservation service regarding various issues related to the flight from Dulles to Jacksonville by way of Hilton Head, such as, for example, delays in departure, a possibility of departing earlier than the scheduled 9:00 AM time, changes in menu and/or drink choices, a substitution of aircraft, etc. During exemplary information flow 70, the reservation service can relay these issues to the traveler, and/or can provide a receipt for the earlier payment. During exemplary information flow 80, the reservation service can provide payment to RoyalAir.

One of ordinary skill in the art can implement method 2 via system 1 utilizing any of a wide variety of well-known architectures, hardware, protocols, and/or software. Thus, the following description of system 1 can be viewed as illustrative, and should not be construed to limit the implementation of method 2.

For example, traveler information device 110 and/or charter operator information device 120 can be embodied as a land-line or wireless telephone, facsimile, personal computer, personal information manager, personal digital assistant, handheld computer, data terminal, and/or other similar device.

Figure 2:
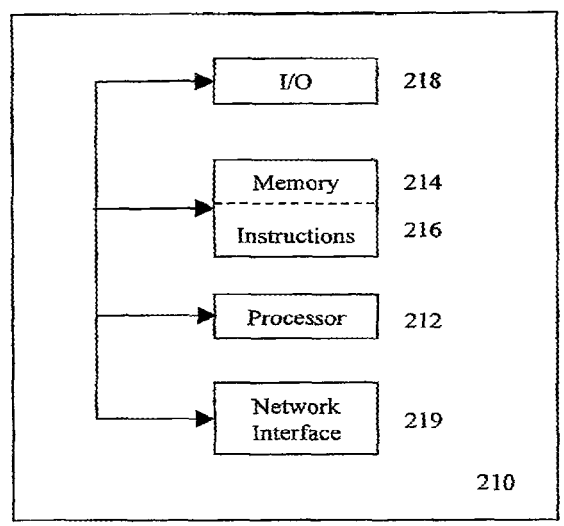
FIG. 2 is a block diagram of a device of the present invention.

Each traveler information device 110, charter operator information device 120, and server 130 can be considered a processing device. FIG. 2 shows an exemplary processing device 210 that can, via its instructions, be adapted to provide the functions of traveler information device 110, charter operator information device 120, or server 130. Processing device 210 can include one or more processors 212, one or more memories 214 containing instructions 216, one or more input/output (I/O) devices 218, and one or more network interfaces 219.

In one embodiment, each processor 212 can be a general purpose microprocessor, such a the Pentium series microprocessor manufactured by the Intel Corporation of Santa Clara, Calif. In another embodiment, processor 212 can be an Application Specific Integrated Circuit (ASIC) which has been designed to implement in its hardware and/or firmware at least a part of a method in accordance with an embodiment of the present invention.

Each memory 214 can be coupled, directly or indirectly, to processor 212 and can store instructions 216 adapted to be executed by processor 212. Memory 214 can be any device capable of storing analog or digital information, such as a hard disk, Random Access Memory (RAM), Read Only Memory (ROM), flash memory, a compact disk, a magnetic tape, a floppy disk, and any combination thereof.

Input/output (I/O) device 218 can be an audio and/or visual device, including, for example, a monitor, display, keyboard, keypad, touch-pad, pointing device, microphone, speaker, video camera, camera, scanner, printer, and/or port to which an I/O device can be attached or connected.

Network 140 can electronically link physically distant traveler information devices 110, charter operator information devices 120, and servers 130 so that information can be transmitted and/or exchanged there between. Network 140 can have any architecture, including a direct connection, a local area network, a wide area network such as the public switched telephone network and/or the Internet, and/or a combination thereof. Network 140 can be a packet-switched, a circuit-switched, a connectionless, or connection-oriented network or interconnected networks, or any combination thereof. Network 140 can be oriented toward voice, data, or voice and data communications. Moreover, a transmission media of network 140 can take any form, including wireline, satellite, wireless, or a combination thereof.

The software of system 1 can take any of numerous forms that are well-known in the art. For example, server 130 can include and/or be coupled to one or more databases having a flat file or a relational organization, and a centralized or distributed architecture. For instance, those of skill in the art can tailor products such as an SQL database to provide the functionality of method 2 and system 1. Moreover, tools such as HTML, XML, XSL, and WAP can be utilized for communications between device 110, device 120, and server 130. Additionally, system 1 can utilize platform-independent and network-centric software such as Java or JavaScript, thereby potentially eliminating the need for server 130. System 1 can also include a Geographical Information System (GIS) within or coupled to server 130. Such systems are typically capable of understanding the spatial relationship of various locations and of tracking the movement of entities across such locations.

There are substantial advantages of the methods and systems of the present invention over the known methods and systems. For example, embodiments of the present invention can allow charter operators to hold their empty leg availability out to a much broader audience and increase their chances of filling these empty legs. Within the audience, there are a large audience of executive travelers that would like the opportunity to fly in a private jet versus the standard commercial flight. Typically, these travelers are flying on full fare coach, refundable tickets and are making adjustments to their schedules at the last minute. With system 1, travelers can check availability of seats on charter flights through the Internet and book a seat on a flight.

Once they book the seat, travelers can be given all necessary information required by the FAA, such as tail number, certificate information, etc. as well instructions on where and when to meet their flight. They can also be given a number to call if they are running late. In one embodiment, once they arrive at the terminal, they will only have to present identification. All tickets can be electronic. As with all charter flights, the plane crew can be responsible for assuring the correct identification is presented and that people are briefed on the safety issues for that aircraft. For each flight there can be an estimated departure time, typically a one-hour window. Unlike commercial flights, however, the plane has some flexibility as to when to leave and can wait for passengers if they are running late, or can leave early if all the passengers have arrived.

If demand for these seats outstrips supply, the reservation service can become a virtual airline booking charter flights through its existing charter transport operator partners to fill this demand. If existing partners cannot meet this demand, the reservation service can also purchase its own planes to fill seat demand between high volume origin-destination-pairs.

System 1 can operate as an 800 number service and/or a web site. If operated as a web site, system 1 can have two major components, an interface for charter transport operators and an interface for travelers. The transport operator interface can provide screens to allow charter operators to post empty leg availability of their jets and some turbo prop trips on planes such as a King Air. This interface can also allow them to maintain a calendar presentation of their overall flight schedules. This tool can make it easier for charter operators to post their schedule and track their overall inventory of flights.

The traveler interface can allow travelers to post passenger accommodation reservation requests identifying the constraints associated with their travel, such as for example, the origin-destination-pairs desired, the days and approximate times of travel between each origin-destination-pair, the type of plane desired, meal and/or drink preferences, smoking preferences, etc.

Requests can be of several forms. For example, a request can be a committed request, wherein if a flight is found that corresponds to the traveler's request, a reservation is automatically made. In this situation, the server can also automatically charge the passenger for the booked reservation. A request can also be a notification request, wherein the server notifies the traveler of the availability of a flight meeting some or all of the constraints identified in the traveler's request. This notification (and all notifications described herein) can occur via any known method, including telephone, fax, pager, e-mail, and/or push technology to the traveler's browser.

Another form of request is a standing request, which would typically be placed by a traveler who travels frequently between a particular origin-destination-pair, such that any available seat corresponding to that origin-destination-pair would generally be of moderate to high interest to that traveler. For example, an entrepreneur who frequently travels between Memphis and Washington, D.C., and who has permanent lodging accommodations at both locations, may be able to adjust his or her business schedule to take advantage of many of the charter flights that arise between those locations having available seats. In this example, the server could automatically notify the traveler regardless of the date and time period of the flight.

Requests can be received in any of several manners. A request can be received directly from a traveler. Also, a request can be received from an agent of the traveler, such as, for example, a travel partner of the traveler, a family member of the traveler, a secretary of a traveler, a travel planner of the traveler, etc. Moreover, a request can be received from a commercial reservation system, such as, for example, the SABRE system.

Similarly, travelers can be notified of available seats in any of several manners. The traveler can be directly notified of the available seat. Also, a notification can be sent to an agent of the traveler, such as, for example, a travel partner of the traveler, a family member of the traveler, a secretary of a traveler, a travel planner of the traveler, etc. Moreover, a notification can be sent to a commerical reservation system, such as, for example, the SABRE system.

System 1 can learn of available seats in several manners. In one embodiment, each participating charter operator can initially provide server 130 with a list of charter transports (e.g., airplanes, helicopters, limousines, yachts, sailboats, etc.) controlled and/or managed by that operator. For each transport, this list can include information regarding the transport, including, for example, the transport's identification number, its seating capacity, its travel capabilities, maintenance records, license information, etc. The reservation server can store this transport information in a database. In one embodiment, the reservation service can also store in the database relevant information regarding the transport, such as, for example any inspection ratings and/or scores for the transport, traveler satisfaction ratings for the transport, complaints regarding the transport, etc.

Then, as empty legs become known to a charter operator, that charter operator can communicate to the reservation server the identification of the charter transport and its availability (e.g., the dates and times it is available for use). Thus, once a reservation request is received, the server can check its database for the available inventory of flights and seats and see whether there is a match or not.

Alternatively, a traveler can provide a passenger accommodation reservation request (e.g., a seat reservation request) to the reservation server, and the server can automatically seek bids to fulfill the seat request from a plurality of participating charter operators. In one embodiment, the server can select the lowest bid and provide it to the traveler. In another embodiment, the server can provide any and/or all received bids to the traveler. The traveler can accept any received bid and communicate this selection to the server, which can provide notification to the corresponding charter operator.

In either case, system 1 can automatically identify one or more charter transports having an available passenger accommodation. A transport can be automatically identified when it is identified without substantial human involvement. For example, in one embodiment, a transport can be identified fully-automatically, wherein there is no human involvement. In another exemplary embodiment, a transport can be identified quasi-automatically, wherein the only human involvement is that needed to initiate a process by which a transport is identified. In yet another exemplary embodiment, a transport can be identified semi-automatically, wherein a list of transports is identified and communicated to a human and the human selects the identification of the transport best meeting the reservation request by, for example, selecting the transport and clicking an "Approved" button on a computer screen.

Travelers can reserve a seat by providing payment information, such as credit card information. Moreover, either when placing a request or when reserving a seat, a traveler can register with the accommodation reservation system. The registration information can include all necessary information about the traveler such as, for example, name, addresses, phone numbers, emergency contacts, etc. Both the payment information and the registration information can be stored by the system, thereby eliminating the need for the traveler to again provide it. Moreover, with this information stored, the traveler can accept and pay for a seat with a single action, such as, for example, by clicking on an "Accept Seat" button.

Once a traveler books a seat, they can be given all necessary information, such as seat number, transport number, tail number, contact information, etc., as well instructions on where and when to meet their flight. The passenger can also be given a number to call if they are running late. In one embodiment, once the passenger arrives at the terminal, they will only have to present identification. All tickets can be electronic. As with all charter flights, the pilots can be responsible for assuring the correct identification is presented and that people are briefed on the safety issues for that aircraft. For each flight there can be an estimated departure time, typically a one-hour window. As soon as all travelers arrive, the plane can depart. Unlike commercial flights, the plane has some flexibility as to when to leave and can wait for passengers if they are running late, or can leave early if all the passengers have arrived.

Travelers can be offered the opportunity to set up a premium service where they input their frequent city pairs and request notification via phone, fax, e-mail, push technology to the traveler's web page, or pager when system 1 has an empty leg available for that origin-destination-pair.

The reservation service can establish a relationship with an on-line travel provider to fill any unfilled travel requests. When requests result in a one-way that needs to be filled, intelligence can be built into system 1 to either offer to fill this through a traditional carrier, offer this sale to charter operators, or to fill this request by matching it with others to fill a plane and create a new charter managed by the reservation service.

The reservation service can set up a frequent traveler program that can allow travelers to earn free trips as they accumulate points. The reservation service can attempt to extend these benefits to existing frequent traveler programs with each airline. The reservation service can also extend this service to American Express customers for Membership Mile members to accumulate points that can be used on other airlines through American Express's existing program.

The architecture for system 1 can begin simply and evolve as demand grows. Initially, system 1 can seek to only complete reservations for exact matches of origin and destination points of travelers that match exactly those for the empty legs entered. This would mean that a flight from New York to Chicago would be matched by a filling an empty leg from Teterboro to Midway, but not a flight from Teterboro to Los Angeles via Midway. Little logic could be required and demand exactly matches supply. This can narrow exact matches, though.

In a second phase, system 1 could allow for a lot more flexibility for both travelers and charter operators. Here system 1 could match traveler requirements with flight paths and routing to optimize the request for all travelers. There can be four main variables utilized in this matching:

1. The geographic location of the plane at any given point;
2. The time that a flight occurs;
3. The price paid for a flight; and
4. The cost of a flight.

Each one of these variables can be subject to variation for a given flight, although system 1 can restrict the fluctuation. For example, system 1 can establish a fixed price for all flights up to a certain mileage or certain operators may require that their planes leave for their home base within a predetermined time of their arrival at a given destination. In addition, there can be economic limits that determine limits for each variable. For example, for any given flight there can be a minimum charge for a passenger needed to recover the cost of carrying that passenger.

Not all of these limits need be hard, and they can all be co-dependent. For example, a potential passenger may be willing to pay more for a flight from an airport that is 30 minutes from their house than for one that is an hour's drive away. The same passenger, however, may be willing to drive the extra distance in order to leave 30 minutes earlier. Thus, system 1 can allow a passenger to search for a flight from a given location at a given time and see in return results for inexact matches.

To determine how to make the matches, consider first the problem of matching only the start or end-point of any given flight. In this case, the variable ranges can be represented as an n-space, with matches of individual combinations represented as shapes within this n-space.

The ranges of each set of variables may not be symmetric and there may be more than three sets of variables (for example number of travelers may be yet another dimension). In any case each variable can be continuous within each range and a function can be defined representing the range of possible values for each variable. This function can have a maximum at the most desirable point within each range. The intersection of the maxima for all variables can give the optimal combination for any one set of possible combinations. This intersection can be thought of as a "center" for each set. It is possible that there may be multiple maxima for a given set of combinations, but for the problem at hand such cases can be decomposed into multiple instances each having a single maxima. For example, someone willing to fly for one price in the morning and a different price in the afternoon can be treated as two separate purchasers. Thus, the process of matching seller and buyer can be a case of finding the closest matches to the center for each set.

The entire problem set can be represented by a combination of the origination and destination into a single entity known as a route. In a market with a high number of buyers or sellers this might give satisfactory results. Initially, however, this may not provide enough matches. In particular, system 1 may fail to find routes that could otherwise be successfully broken into two or more pieces thus matching multiple requests. Thus, a given flight can be treated as a linked list representing all possible routes within a given geographic area and a given time span. Matching can then begin by matching flight origination together as a best match described above. If the destination falls within the range of possible destinations for the flight the possibility is retained for further investigation. If a set of exact origination and destination matches can be made then no further work is needed. If the destination is not the flight's final destination then a new origination can be created and can be used to possibly match other requested flights. Similarly, matches can be made against destination and used to generation possible origins.

The process of generating and matching new origins and destinations is the classic "traveling salesman" problem, which is known to be NP complete. This means that as the number of possible endpoints grows as the number of possible solutions grows non-linearly and the best solution cannot necessarily be found within a given finite time frame.

There are several approaches for finding close approximate solutions to the traveling salesman problem. In particular, Monte Carlo and genetic algorithms may be applicable as well as applying neural networks. In the worst case, generating anything approaching near time matches to Web requests could require extensive hardware and still provide only affirmative matches for exact matches. As a result, the process of matching flights and requests can be treated as an hour long process with e-mails generated thereafter to the travelers telling them of the results for a given request. Alternatively, the process of matching flights and requests can be treated as an ongoing process which ends a predetermined time prior to departure.

Collection and presentation of the results can be through Web browsers, thus the de-facto standards of the Web can determine the architecture of system 1. Moreover, system 1 can separate its presentation logic from its business logic. Thus, a multi-tiered system with browsers, application servers, and database servers can be utilized.

Architecturally, in order to capture its main variables, system 1 can consider four main entities:

1. Travelers;
2. Carriers;
3. Routes;
4. Accounts.

A traveler can become a passenger when a passenger accommodation (e.g., a seat, cabin, bunk, etc.) reservation is booked in their name. Carriers can operate one or more forms of transportation. That is, system 1 is not necessarily limited to jets. Instead, system 1 can be utilized for reserving passenger accommodations on helicopters, yachts, sailboats, and even limousines. Routes can be determined by the capabilities of the forms of transportation in use. Accounts can track the costs and payments.

Some of the basic relationships and sub-entities of these entities can be as follows:

Travelers can book reservations for passenger accommodations;
Carriers can operate transports;
Transports can travel certain routes;
Routes can have costs associated with them;
Transports can have operating costs associated with them;
Travelers can book certain routes.
Routes can have an origination and a destination (origin-destination-pair);
Routes can be traversed in a certain time period;
Travelers and passengers can have arrival and departure times.

Based on these conceptual requirements, a combination of exact and fuzzy logic can be used to match travelers to routes. Both forms of logic can be handled by a fuzzy logic application since exact matches can be coded as discrete values (instead of ranges) within such an application.

As described above, embodiments of the present invention can provide a method for scheduling travel on a charter transport. The method can include obtaining from a traveler a passenger accommodation request identifying an origin-destination-pair. The method can also include automatically identifying one or more charter transports having an available passenger accommodation. Moreover, the method can include notifying the traveler of the available passenger accommodation.

Still other advantages of the present invention will become readily apparent to those skilled in this art from the above-recited detailed description. Accordingly, the drawings and descriptions are to be regarded as illustrative in nature, and not as restrictive.

What is claimed:

1. A computer implemented method for on-demand private aircraft comprising:
   a. receiving by a computer based reservation service from the owners or operators of private aircraft availability information including reservation criteria for an empty leg or shared ride flight, said reservation criteria including a departure location, a departure time constraint, a minimum number of passengers, and an agreed upon payment schedule required to reserve the private aircraft;
   b. posting on a web site, by the computer-based reservation service, at least a portion of the availability information relating to departure location and destination of various private aircraft;
   c. receiving via its website by the computer based reservation service from prospective passengers preferred flight data for private aircraft, the preferred flight data defining at least one of empty leg flights and shared flights selected by prospective passengers;
   d. said payment schedule being determined prior to said posting, and said payment schedule including a cost per seat;
   e. receiving, by the computer-based reservation service, reservation offers from a plurality of independent passengers, each of the reservation offers including an agreement to a specific destination request and a predetermined payment schedule;
   f. selecting a number of the received reservation requests, wherein the selected requestes collectively are consistent with said reservation criteria for an identified private aircraft;
   g. communicating received reservation offers from one or more independent passengers to owners or operators of private aircraft;
   h. receiving any changes in said predetermined reservation criteria and communicating said changes to each of said independent passengers associated with the offers;
   i. accepting the selected reservation offers consistent with any said changes;
   j. communicating to each of the independent passengers associated with the selected offers a passenger notification of the acceptance;
   k. communicating to an owner or operator of the identified private aircraft an owner or operator notification of the acceptance; and
   l. transmitting to the owner or operator of an identified private aircraft a passenger list corresponding to the selected reservation offers and a flight schedule that is substantially consistent with the departure time constraint, the departure location, and the specific destination request.

2. The method according to claim 1 wherein posting on a web site, by the computer-based reservation service, at least a portion of the availability information relating to departure location and destination of various private aircraft includes the posting of several private aircraft owned or operated by different entities at various locations throughout the United States.

3. The method according to claim 1 wherein the aircraft listed includes aircraft of different sizes.

4. The method according to claim 1 wherein the departure information identified by a prospective passenger includes preferred day of departure and number of passengers.

5. The method according to claim 1 wherein the cost per seat is adjusted depending on the number of seats sold.

6. The method according to claim 1 wherein the passengers are notified of a confirmed time and place of departure at least 24 hours before departure time.

7. The method according to claim 1 wherein each passenger independently agrees to the time, date, type of aircraft, place of departure and destination prior to agreement of owner or operator to provide the agreed to service.

8. The method according to claim 1 wherein prospective passengers are apprised of a final flight schedule for an aircraft by a computer based system of communication.

9. The method according to claim 1 wherein the aircraft owner or operator is apprised of reservation offers by a computer based system of communication.

10. The method according to claim 1 wherein payment by each passenger is made to the reservation service independently.

* * * * *